Feb. 11, 1958    M. HOROVITZ    2,822,676
TORQUE TRANSMISSION COUPLINGS
Filed March 28, 1955    2 Sheets-Sheet 1

Inventor
Marcus Horovitz.
By Ralph B. Stewart
attorney

Feb. 11, 1958   M. HOROVITZ   2,822,676
TORQUE TRANSMISSION COUPLINGS
Filed March 28, 1955   2 Sheets-Sheet 2

Inventor
Marcus Horovitz
By Ralph B. Stewart
attorney

United States Patent Office 2,822,676
Patented Feb. 11, 1958

2,822,676

TORQUE TRANSMISSION COUPLINGS

Marcus Horovitz, Leicester, England, assignor to Metalastik Limited, Leicester, England, a corporation of Great Britain Application March 28, 1955, Serial No. 497,078

Claims priority, application Great Britain May 7, 1954

1 Claim. (Cl. 64—11)

This invention relates to torque transmission couplings.

One of the objects of the invention is to provide a design of coupling such that the particular mechanical requirements of the situation in which the coupling is to be used can be readily taken account of, while at the same time being cheap.

The invention consists in a torque transmission coupling comprising an inner element having the shape of a convex double cone, and outer element having the shape of a concave double cone, and an intermediate filling of rubber in a state of pre-compression.

The outer element is preferably assembled from two internally-coned pieces clamped together to form the concave double-cone.

The following description relates to the drawings accompanying the provisional specification, which show, by way of example, one embodiment of the invention.

Figure 1:
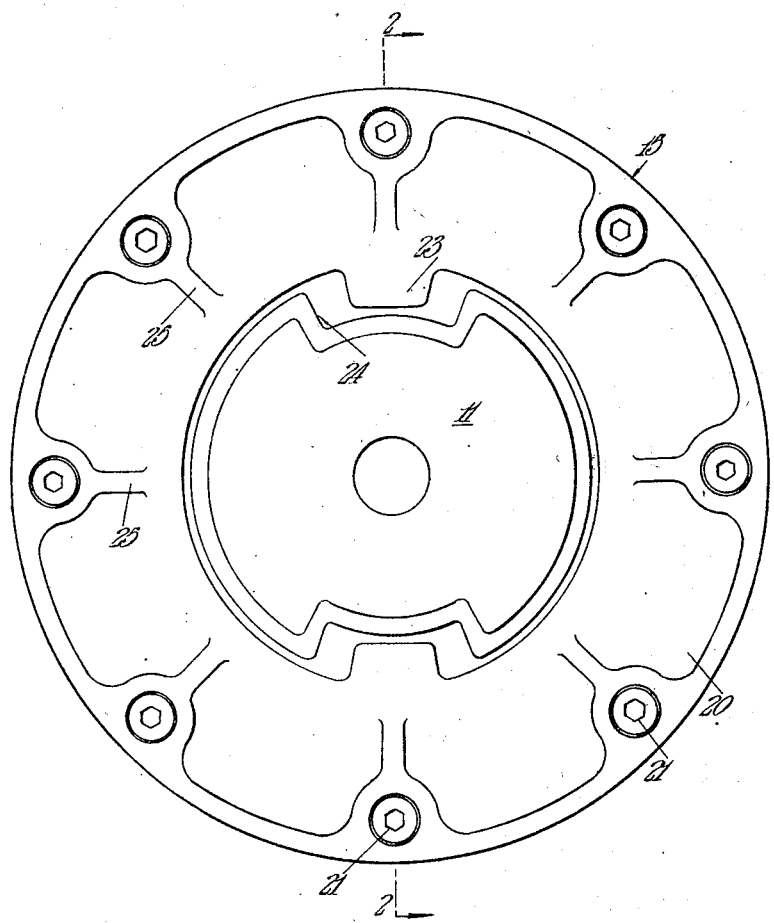
Figure 1 is an end view of the coupling.
Figure 2:
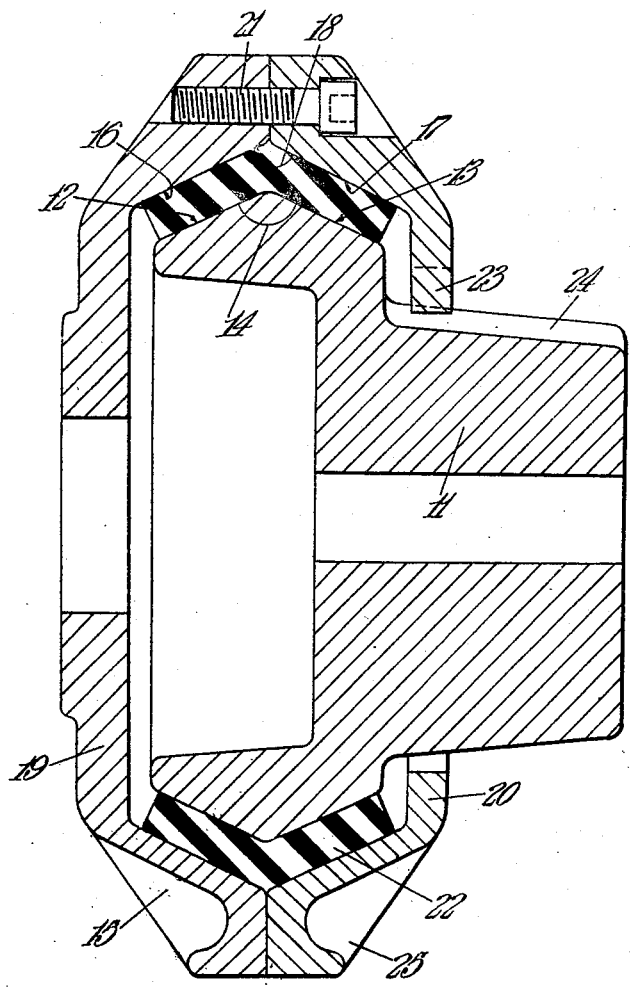
Figure 2 is a radial section on the line 2—2 of Figure 1.

The coupling shown in the drawing provides for the transmission of torque between two shafts or other rotary components (hereinafter referred to simply as "shafts"), while affording varying degrees of resilient yield to transient deflections between the shafts in four modes, namely axial, radial, torsional, and conical. The drawings show only the coupling itself, it being well understood that the elements thereof are adapted to be secured on their respective shafts in any suitable manner. Accordingly, it will be convenient to speak of the coupling elements with reference to their relationship one to the other, one as an "inner" and the other as an "outer" element; and no distinction is made between the two elements as to one being the driving element and the other the driven element, though it may be preferable in any particular use of the coupling that one rather than the other should be the driver.

The inner element 11, then, may be described as having the shape of a convex double cone with broad apical angle. In other words the operative surface of the inner element 11 is defined by the external peripheral surfaces 12 and 13 of two frusto-cones fitted base to base so that the apical angle 14 between them is of the order of say 140°.

The outer element 15 may likewise be described as having the shape of a concave double cone with corresponding apical angle. In other words the operative surface of the outer element 15 is defined by the internal peripheral surfaces 16 and 17 of two frusto-conical annuli fitted end to end with their larger ends together and with the apical angle 18 between them also of the order of 140°.

The inner element 11 is formed from a single piece. The outer element 15 is assembled from two internally-coned pieces 19 and 20 clamped together by a set of peripheral screws 21; this two-piece formation is adopted partly as a convenience in assembly of the complete coupling and partly as an aid in obtaining certain relative dimensioning as will hereinafter appear.

Between the juxtaposed operative surfaces of the concave and convex double cones is located a filling 22 of rubber. This rubber filling 22 is bonded to the operative surface 12 and 13 of the convex-double-coned inner element 11. The thickness of the rubber filling 22 measured normally to the respective surface 12 or 13 is greater when in the free state prior to fitting of the outer element 15 than it is in the confined state after fitting the outer element 15. When the two pieces 19 and 20 of the outer element 15 are put into position and clamped together by the screws 21, the rubber filling 22 is put into a state of compression both axially and radially with respect to the axis of the coupling. The degree of such compression and the relation between the axial and radial values, will of course have been determined by the dimensions of the parts. The various stiffness requirements of the coupling in the four modes above-mentioned are obtained by varying the dimensions of the rubber element as far as length, diameter, rubber thickness and the angle of the cone are concerned.

In order to avoid a complete failure of the device should the rubber filling 22 fail, loose splines are formed interengagingly between the inner and outer elements 11 and 15, consisting of smaller width lugs 23 on the outer elements 15 riding freely within larger width grooves 24 in the inner element 11.

The two parts 19 and 20 of the outer element 15 are strengthened by radial webs 25.

It will of course be understood that the invention is by no means confined to what has been described with reference to the drawings. Thus the apical angle 14 of the inner element may be different from the apical angle 18 of the outer element. Again, the two frusto-cones defining the inner surface may be of different angles from one another, as may the two defining the outer surface.

The frusto conical surfaces defining the inner surface, and those defining the outer surface, may have their generating lines other than straight; thus each half of the inner surface may be convex and each half of the outer surface concave, so that the shape of the rubber filling is spherical or substantially so. The rubber filling 22 need not be bonded to the inner surface. The rubber of the filling 22 may be natural or artificial.

Since the outer metal parts can be continued to an inside diameter smaller than the minimum rubber diameter, the rubber can be well protected against damage from oil, etc.

In the manufacture of the outer element 15, the two pieces 19 and 20 may be cast, without the conical surfaces 16 and 17 being machined; thereby not only providing a suitable rough surface for gripping the rubber 22, but also avoiding expense during the manufacture. The rubber 22 may be stuck to the surfaces 16 and 17, as also to the surfaces 12 and 13, by a cold-setting synthetic resin adhesive.

A coupling such as that shown in the drawing is well adapted for use in transmitting torque between the engine and propeller of a marine installation. In such an application the coupling may need to withstand a considerable axial thrust as well as transmitting torque. The pre-compression of the rubber 22 should be enough to exceed the maximum end thrust exerted on the coupling by the propeller.

A considerable amount of angular misalignment between the shafts connected to the two sides can be permitted; while two of these couplings connected by an intermediate shaft can also cater for a considerable amount of parallel misalignment.

In designing a coupling embodying this invention for any particular purpose, it must be appreciated that for maximum conical flexibility the rubber and its bonding surfaces should approximate in shape to a sphere, since conical flexibility depends upon a distortion of the rubber in shear and not in compression. Torsional flexibility of course depends upon pure shear. In the radial mode, the coupling is very stiff, as this is a matter of pure compression; and that stiffness prevents whirring of the shaft. Axially also, the coupling is stiff, giving a good resistance to end thrust.

What I claim is:

A torque transmission coupling comprising an inner coupling element having a circular section concentric with its axis, the middle portion of said circular section being of greater diameter than the end portions thereof, an outer coupling element formed of an internally grooved annular ring surrounding said circular section and providing an annular space between said circular section and the walls of said groove, the annular groove within said ring having a maximum diameter in a plane intermediate the sides of the groove and decreasing in diameter towards the sides thereof to a diameter less than the maximum outside diameter of the circular section of said inner member, a sleeve of rubber filling said annular space and having a radial thickness in a free state greater than the radial thickness of said annular space, said annular ring being divided into two annular parts at the plane of maximum diameter of said groove, means for clamping said annular parts together to compress said rubber sleeve against said circular portion, a hub portion carried by the inner member adjacent said circular portion and having a longitudinal groove formed in the outer surface thereof and a spline on the annular ring, said spline extending inwardly into the groove in said hub and having a smaller width than said groove.

References Cited in the file of this patent

UNITED STATES PATENTS

| | | |
|---|---|---|
| 2,126,708 | Schmidt | Aug. 16, 1938 |
| 2,491,734 | Hirst | Dec. 20, 1949 |

FOREIGN PATENTS

| | | |
|---|---|---|
| 376,443 | Great Britain | 1932 |